UNITED STATES PATENT OFFICE.

WILLIAM J. MELHUISH, OF UPPER PARKSTONE, ENGLAND.

PROCESS FOR THE MANUFACTURE OF ARTIFICIAL MILK, AND THE TREATMENT OF ITS RESIDUES.

1,210,667. Specification of Letters Patent. Patented Jan. 2, 1917.

No Drawing. Application filed October 22, 1915. Serial No. 57,365.

*To all whom it may concern:*

Be it known that I, WILLIAM JAMES MELHUISH, a British subject residing at Highwood House, Upper Parkstone, in the county of Dorset, England, lecturer in dietetics, have invented a new and useful Process for the Manufacture of Artificial Milk, and the Treatment of Its Residues, of which the following is a specification.

In my United States specification bearing the Serial Number 842,257 I describe a method of making artificial milk deriving the casein from the soy bean. While good milk can be made under this patent long experience has shown difficulties which the present invention is designed to overcome. The soy is not marketed as one would wish: it contains impurities and the meal varies much. The enzym in the bean causes frequent anxiety and the nauseous oil has to be removed thus delaying the process and involving considerable expense in separators, their cleaning and upkeep. Furthermore the production of milk from the soy beans can only be worked profitably on a large scale; the expense and complexity of the machinery required make it utterly impossible to produce a daily output of from 5 to 50 gallons at a sufficiently low cost to compare favorably with cow's milk.

In the manufacture of my new artificial milk I have to arrange synthetically for all the ingredients in the varied proportions of ordinary cow's milk. For the purpose of providing the casein and albumin I am limited to the *Leguminosæ* and only to a certain small number of species within the order, for I must avoid those with any appreciable starch content. Further, the oil must be of an edible character, and the supply of the legumes cheap and plentiful. I prefer the arachis or ground nut for the purpose, which nut is commonly known in America as the pea nut. Its legumin is suitable and its oil free from unpleasant taste. I prepare the nuts (previously shelled) by boiling them for a few minutes in a bath of water containing carbonate of soda, stirring well, the skins of the nut will give up their color to the water, and one or two or three such washings may be necessary. At the stage of the work when the skins no longer tinge the water, they are partially dried by shaking on a sieve and then they are ground up into a coarse flour and so far I have found nothing better than the ordinary household mincing or meat-chopping machine, made sufficiently large for the purpose. The milling is dustless, requires very little labor, and there is practically no waste.

I use the nuts with their skins on for the sake of economy in purchasing, and also for the fact that I get rather more of the valuable mineral salts by using the complete nut. I may however use nuts already blanched, or blanch them myself. And same may be either plain or roasted. In either case I find it advisable to wash in soda water to remove the last trace of color. Again, I have used the nuts in the form of a meal, ready ground, but get the best results by grinding them myself, thus insuring freshness. The coarse meal being provided the next consideration is the water. According to the conditions of the water supply, I may use either plain, distilled or previously boiled water, and I certainly prefer to boil ordinary town supplied water if I am using same. The water, however treated, has to be heated (or cooled) to a temperature ranging between 75 degrees and 85 degrees C., and the quantity of meal required will naturally depend on analysis of the nuts under treatment, but an average commercial sample will need say 16 per cent. of meal to the weight of water used for the finished milk. Thus supposing I take as a working example 10 gallons of milk, this, equaling 100 pounds will require 16 pounds of meal. A pan must be provided with a steam (or hot water) jacket so that the temperature may be kept even and a vigorous stirring or beating gear must be provided. For small batches such as that used in the example above quoted, the pan can be kept hot over a gas ring, steam power being only necessary in outputs exceeding 200 gallons daily. The 10 gallons of heated water is then made alkaline by the addition of any of the alkaline salts usually found in milk. For instance, one may at this stage introduce sufficient quantity of limewater, sodium carbonate, sodium or potassium hydrate, sodium phosphate and calcium chlorid. The sodium phosphate in connection with calcium chlorid help to keep the proteids in solution. The proportion of salts will depend to a large extent on the cow's milk which is taken as a standard, and the calcium salts will be modified according to the degree of hardness of the water used. It is better to add the few grains of calcium chlorid, after the meal has been added to the water. The salts being well stirred and dissolved in the water, the meal is added and stirred to insure a thorough mixing and the avoidance of lumps in the solution. This with the arachis meal is a very simple matter and in a 10 gallon batch only involves a short stirring with a large spoon to insure efficient results. As soon as this is complete the calcium chlorid can be added, and then the sugars can be poured in.

For the sugar content I prefer a light malted dextrin in a water-white-syrup-form such as is used by brewers, and the neutral variety suits best of all. I aim for a 4.5 per cent. content in a finished milk, but the syrup as sold commercially contains varied quantities of water, sometimes as high as 25 per cent. and this moisture must be allowed for when weighing out the quantity for the process.

The whole will be vigorously beaten for a suitable period of time depending on the quality of nuts, never less than 20 minutes and certainly never longer than an hour, for the purpose of extracting the soluble casein and emulsifying the oil. In this emulsifying process the sugar syrup greatly helps, hence its introduction at this stage. The liquor being finished is then strained through a fine meshed cloth, when it will be noticed that the whole is extremely white in color and the fat well emulsified in same. The residue remaining on the cloth is pressed so that as much liquor as possible is got out, and then quite apart from the milk-making and without any immediate connection therewith, the meal is well washed in purified hot water and pressed again. Any suitable press may be used. I prefer a tincture press of sufficient size using a cloth for inclosing the meal in the perforated press box. The meal after drying in ovens, can be formed into a delicate food fit for human use, the excessive fat and nitrogenous content being now removed. To this end I may roast or grind the residue and mix same with any sweet or savory ingredient for the purpose of making it into a salable food. The whitish water which comes from the washing can be used for (1) adding to the batch in hand to replace any water lost in the process of making, and (2) for the first water necessary in the making of a later batch of milk the same day. I now add to the liquor the remainder of the salts necessary to complete the series together with the fatty acids necessary to make the arachis oil into a complete imitation of cow's milk cream. Of these probably the butyric acid is the most interesting, and as this is poured into the milk solution, with a vigorous stirring, a great improvement in the color of the milk is obvious to the worker.

If the stirring gear in the first stage of the process has been worked vigorously an almost perfect emulsification should have taken place and only a few minutes' stirring will be necessary to blend in the acids and insure the mixing in of the mineral salts. As it will be noticed that the product is milk-like in color and on tasting, if properly made, no trace of the nut flavor remains, no further mechanical working is required, but in larger single batches of from 25 to 1000 gallons a vacuum pan is a great advantage at this stage. If such is used a much larger quantity of water will be necessary in the first pan. Instead of the exact weight of the water in the finished milk it will be necessary to work with at least 50 per cent. more and the whole fluid consequently would be thinner right through the process. The vacuum pan working would then adjust the quantity of the milk to the ultimate quantity decided upon by boiling away the excess and a vigorous boil under a vacuum of from 26 to 29 inches will so effectively mix the whole ingredients as to make the milk a perfect blend. Whether the vacuum pan is used or not the remainder of the process is very simple. A strong culture of pure milk bacteria is added, allowed to mature for a given period sufficient to yield an acidity of any predetermined strength, and pasteurization at 60 to 70 degrees C., for 20 minutes' straining and final cooling follows. The addition of a suitable quantity of citric acid alone is necessary to make the milk fit for consumption, and standing for two hours yields a fluid indistinguishable from rich cow's milk.

Such a milk as described in this specification should contain at least 13 per cent. total solids and show a good lactometer reading.

With the sale of the dried residue meal as a human food, and a general care of all ingredients at all points such a nutritious milk can be produced for a few pence per gallon and the time from the beginning of the work to the completion should be well under 2½ hours, including the cleaning necessary as the work goes along. With the vacuum pan a little longer time must be allowed.

For the use of mineral water manufacturers it may be desirable to retain a distinct nutty flavor in the milk. To insure this I omit the soda in the preliminary washing of the nut, and I should also omit the butyric acid. Very much less culture would also be needed.

With the vacuum pan any degree of condensation is possible, either to a thick creamy, a pasty, or a powdery condition. By such modifications as are obvious, one can get any variety of milk, either humanized, medicated, malted, lactic or any form of soured milk. The whiteness of the casein and its fine texture enable it to be used as a commercial casein or for cheese-making.

In the making of margarin the milk produced under this process is extremely valuable. At present about 50 gallons of cow's milk are used to each ton of margarin, such milk being freed from fat and made more or less sour. The present scarcity of cow's milk combined with its high price, added to which are the well known difficulties of getting a uniform product show the need of a nut milk such as I have described. For the purpose of the margarin trade the arachis fat will be an advantage: the milk will be made just as described except that the culturing will be by means of the powdered or jelly butter starters and sufficient of such starter will be added to insure souring by the time the milk is needed for use in the factory.

It is possible to build up a cream which can be churned directly for the production of margarin. For this purpose a fat which is solid at normal temperatures—such as that of the cocoa-nut—is to be desired, although other forms of fats and oils can be used. They should be fed into the fluid while in the vacuum pan, the oils being sucked in through a fine nozzle so that they may fall into the batch in a finely divided state. With care from 30 to 52 per cent. of fat can be taken up in this way, and vigorous vacuum boiling insures a sufficient emulsification. The cream, on finishing, is kept at about blood heat for a lactic culture to work effectively and so sour the mass ready for the churn.

I claim:

1. The herein described process of making a milk-like fluid by well cleaning and decolorizing arachis (pea) nuts, grinding same into a coarse flour and stirring the said flour in hot water containing dissolved alkaline salts and carbo-hydrate: straining the resultant mixture through fine meshed cloths and treating the clear liquor with further salts and fatty acids: blending same by vigorous stirring: culturing the liquor with lactic bacteria: pasteurizing and cooling ready for use as a milk, similar in its action, flavor and food value to cow's milk.

2. The herein described process of making a milk-like fluid by well cleaning and decolorizing arachis (pea) nuts, grinding same into a coarse flour and stirring the said flour in hot water containing dissolved alkaline salts and carbo-hydrate: straining the resultant mixture through fine meshed cloths and treating the clear liquor with further salts and fatty acids: blending same in a vacuum pan: culturing the liquor with lactic bacteria: pasteurizing and cooling ready for use as a milk, similar in its action, flavor, and food value to cow's milk.

3. The herein described process of making a milk-like fluid by well cleaning and decolorizing arachis (pea) nuts, grinding same into a coarse flour and stirring the said flour in hot water containing dissolved alkaline salts and carbo-hydrate: straining the resultant mixture through fine meshed cloths and treating the clear liquor with further salts and fatty acids: blending same by a vigorous stirring: culturing the liquor with lactic bacteria: evaporating more or less of the water to make a concentrated milk.

4. The herein described process of making a milk-like fluid by well cleaning and decolorizing arachis (pea) nuts, grinding same into a coarse flour and stirring said flour in hot water containing dissolved alkaline salts and carbo-hydrate: straining the resultant mixture through fine meshed cloths and treating the clear liquor with further salts and fatty acids: blending same in a vacuum pan: culturing the liquor with lactic bacteria: evaporating more or less of the water to make a concentrated milk.

5. The herein described process of making a milk-like fluid by well cleaning and decolorizing arachis (pea) nuts, grinding same into a coarse flour and stirring the said flour in hot water containing dissolved alkaline salts and carbo-hydrate: straining the resultant mixture through fine meshed cloths and treating the clear liquor with further salts and fatty acids: blending same by a vigorous stirring: culturing the milk with sufficient butter starter to insure its souring in a given time and thus fitting it for use in the manufacture of margarin and other butter substitutes.

6. The herein described process of making a milk-like fluid by well cleaning and decolorizing arachis (pea) nuts, grinding same into a coarse flour and stirring the said flour in hot water containing dissolved alkaline salts and carbo-hydrate: straining the resultant mixture through fine meshed cloths and treating the clear liquor with further salts and fatty acids: blending same in a vacuum pan: culturing the milk with sufficient butter starter to insure its souring in a given time and thus fitting it for use in the manufacture of margarin and other butter substitutes.

7. The herein described process of making a milk-like fluid by well cleaning and decolorizing arachis (pea) nuts, grinding same into a coarse flour and stirring the said flour in hot water containing dissolved aklaline salts and carbo-hydrate: straining the resultant mixture through fine meshed cloths and treating the clear liquor with further salts and fatty acids: feeding the liquor into a vacuum pan and sucking into same with a fine nozzle any desired fat to make a cream and boiling the whole under vacuum to emulsify same: culturing the finished mass with milk bacteria to insure the end desired and if need be pasteurizing and cooling same to produce a cream for churning and table use.

8. The herein described process of making a milk-like fluid by cleaning the arachis (pea) nut in plain hot water, grinding same into a coarse flour, stirring the said flour in hot water containing dissolved alkaline salts and carbo-hydrate: straining the resultant mixture through fine meshed cloths and treating the clear liquor with further salts: blending same by vigorous stirring: lightly culturing the milk with lactic bacteria for not more than 20 minutes: pasteurizing and cooling ready for use as a milk with a distinctive nut flavor suitable as a beverage or for cooking.

9. The herein described process of making a milk-like fluid by cleaning the arachis (pea) nut in plain hot water, grinding same into a coarse flour, stirring the said flour in hot water containing dissolved alkaline salts and carbo-hydrate: straining the resultant mixture through fine meshed cloths and treating the clear liquor with further salts: blending same with a vacuum pan: lightly culturing the milk with lactic bacteria for not more than 20 minutes: pasteurizing and cooling ready for use as a milk with a distinctive nut flavor suitable as a beverage or for cooking.

10. As a new article of manufacture, a nut milk in which the protein and parts of the cream fat and salts are extracted from the arachis (pea) nut, designed for human and animal food purposes, and having the appearance, taste, consistency and uses of cow's milk which it is intended to replace in every way in which cow's milk is used.

11. As a new article of manufacture, a nut milk in which the protein, cream fat and part of the salts are extracted from the arachis (pea) nut, designed for human and animal food purposes, and having the appearance and consistency of cow's milk with a distinctive nut flavor, fitting it for the purposes of a healthful beverage or for such other uses in which the nut flavor would be desirable.

In testimony whereof I affix my signature in the presence of two witnesses.

W. J. MELHUISH.

Witnesses:
  A. J. BALL,
  P. W. SLINGSBY.